United States Patent [19]

Yamamoto

[11] Patent Number: 4,601,564

[45] Date of Patent: Jul. 22, 1986

[54] LENS BARREL HAVING MOTOR

[75] Inventor: Hiroshi Yamamoto, Kanagawa, Japan

[73] Assignee: Canon Kabushiki Kaisha, Tokyo, Japan

[21] Appl. No.: 739,381

[22] Filed: May 30, 1985

[30] Foreign Application Priority Data

Jun. 5, 1984 [JP] Japan .................. 59-082562[U]

[51] Int. Cl.$^4$ ............................................ G03B 9/02
[52] U.S. Cl. .................................................. 354/271.1
[58] Field of Search ................ 354/195.1, 271.1, 400; 350/449, 450

[56] References Cited

U.S. PATENT DOCUMENTS 4,113,359 9/1978 Koilse et al. ............... 354/271.1 X
4,460,253 7/1984 Kawai et al. ............... 354/271.1 X
4,472,039 9/1984 Iwata et al. .................. 354/271.1

Primary Examiner—Michael L. Gellner
Attorney, Agent, or Firm—Toren, McGeady, Stanger, Goldberg & Kiel

[57] ABSTRACT

A lens barrel having incorporated therein a motor includes a vibration-proof ring for absorbing vibrations of the motor, which ring is made in such a form as to accommodate the lead wires of the motor.

3 Claims, 4 Drawing Figures

LENS BARREL HAVING MOTOR

BACKGROUND OF THE INVENTION

1. Field of the Invention

This invention relates to a technique of reducing the vibration of a motor produced when the motor is incorporated in a lens barrel to drive a diaphragm, shutter, or lens.

2. Description of the Prior Art

In the past there was the technique of incorporating into the photographic lens mounting a motor for driving the diaphragm or the lens. This motor was either a coreless motor causing little vibration, or a moving coil type diaphragm drive device, or the so-called "autoiris". There is a proposal for using a stepping motor for driving the diaphragm or the like. But the stepping motor has significant vibrations due to the cogging as it is driven to rotate. Particularly, in the case of cameras which are high precision machines, when vibrations are generated in the lens barrel, not only a bad influence is given to the internal mechanisms of the camera but also the photographer is annoyed at unpleasant feeling and cannot even concentrate his mind on shooting the object. Nevertheless, no proposal concerning countermeasures against the vibrations arising when the stepping motor is incorporated into the lens barrel has yet been made.

SUMMARY OF THE INVENTION

With the above-described problem of the prior known technique in mind, it is an object of the present invention to provide a lens barrel having a stepping motor incorporated therein with means for absorbing the vibrations of the motor which is also advantageous in structure for arrangement of wirings.

To attain this object, in application to lens barrels having incorporated therein an electromagnetically operated motor as the drive source for the diaphragm, the lens or the like, the motor is supported by a vibration absorbing member having a plurality of grooves formed on the surface of a cylindrical member in which the motor is fixed, and the lead wires of the windings of the motor are arranged in the grooves.

DETAILED DESCRIPTION OF THE PREFERRED EMBODIMENTS

Figure 1:
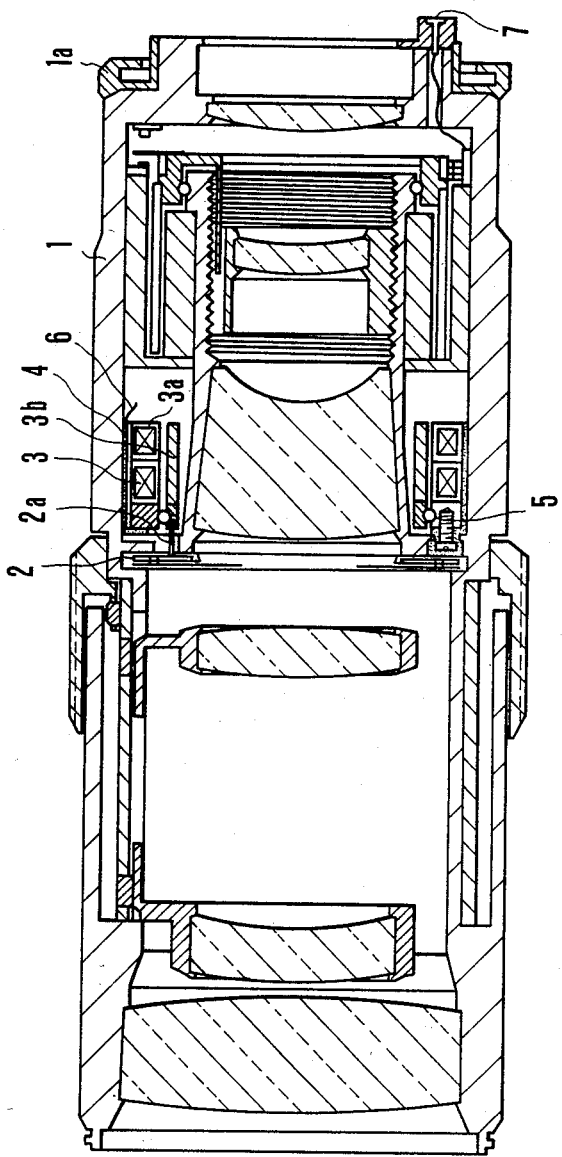
FIG. 1 is a longitudinal section view of a lens barrel having a stepping mode for a diaphragm incorporated therein.

Referring to FIG. 1, a stationary cylinder 1 has a mount 1a at the rear end thereof to couple with a camera body. A diaphragm unit 2 is fixedly fitted in the inner diameter of the stationary cylinder 1 at the center of the longitudinal length thereof. A hollow core cylindrical type stepping motor 3 comprises a stator 3a fixedly secured to the inner surface of the stationary cylinder 1 through a vibration-proof member 4 by a plurality of screw fasteners 5, and a rotor 3b supported inside of the stator 3a in concentric relation through a ball bearing. This rotor 3b is drivingly connected to the diaphragm unit 2 in such a way that a drive member 2a engages in a recessed portion 3c in the front end of the rotor 3b. The stator 3a is connected through power supply lead wires 6 to a contact 7 in the rear wall of the stationary cylinder 1. When coupled with the camera body, the contact 7 engages with a contact in the camera body so that the electrical power is supplied to the motor 3 from a battery in the camera body.

Figure 2:
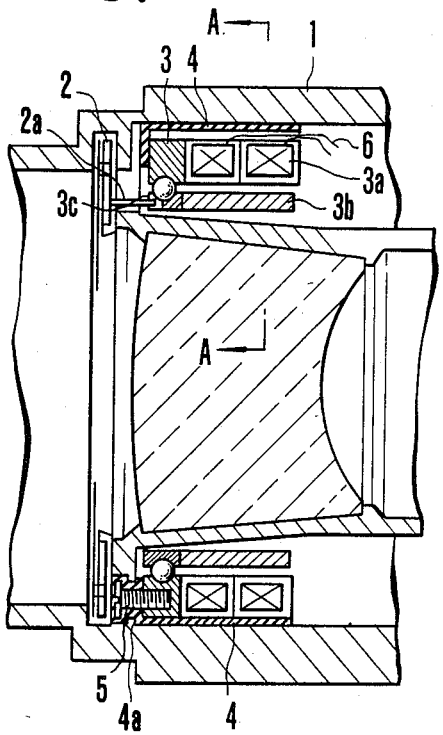
FIG. 2 is a fragmentary section view in enlarged scale of the main parts of the lens barrel of FIG. 1.
Figure 3:
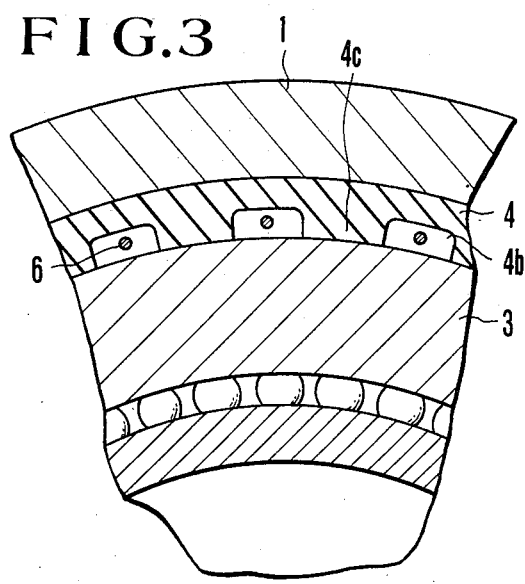
FIG. 3 is a cross-sectional view in further enlarged scale taken along line A—A of FIG. 2.
Figure 4:
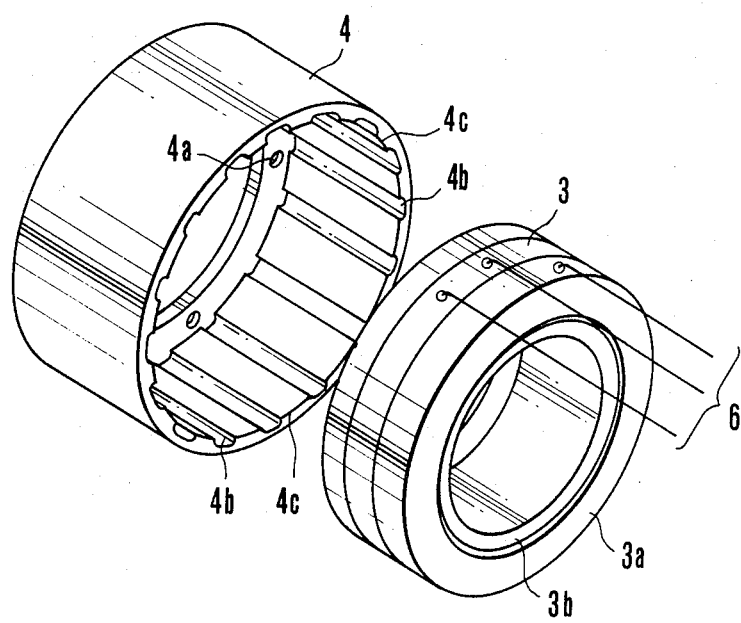
FIG. 4 is an exploded perspective view of the vibration-proof member and the main parts of the motor.

The aforesaid vibration-proof member 4 is made of rubber or like elastic material and is formed by molding means with its screw-threaded portions 4a for the fasteners 5 in conformity with the shape of the fastener 5 so that the screw fasteners 5 do not contact directly with the stationary cylinder as shown in FIG. 2. Also as shown in FIGS. 3 and 4, its inner peripheral surface has the plurality of axial grooves 4b, 4b, . . . which in turn give projected portions 4c, and the grooves 4b provide spaces for allowing the aforesaid lead wires 6 to be installed.

Next, we explain on the vibration-proof action of the embodiment of the invention.

The vibrations of the stepping motor 3 may be classified into two main groups. One of them propagates along a circle with its center at the axis of rotation. To this belong the vibration coming from the cogging of the stepping motor 3 and the one produced by the inertia of the rotor 3b as the motor 3 is accelerated or decelerated. Another group of vibrations go outward or inward in the radial direction as the motor rotates continuously. This too has the main cause ascribable to the cogging. The former or the tangential vibration is absorbed by the screw-threaded portions 4a of the vibration-proof member 4, and, at the same time, the projected portions 4c in frictional contact with the outer periphery of the motor react to bend so that the vibration is not transmitted to the stationary cylinder 1. Also, the latter or the radial vibration is received in the form of compression of the projected portions 4c. The compressed projected portions 4c react in a direction to decrease the volume of the grooves 4b so that the vibration is not transmitted to the stationary cylinder 1.

These vibrations have generally a high frequency, and their amplitudes are but very minute. Also, when the vibrations have damped, or when the motor is not driven to move, the rotating parts of the motor is brought into and maintained stable in the indicated position by the elasticity of the vibration-proof member. Therefore, no phase error between the diaphragm and the rotating part of the motor is caused to occur by the use of the vibration-proof member 4.

Further it is in the peripheral direction that the coupling recess 3c of the stepping motor 3 engages the couping member 2a of the diaphragm unit 2. Therefore, the radial vibration does not transmit to the diaphragm unit 2.

Meanwhile, the power supply line to the motor is often on the outer peirphery of the motor. In actual practice, according to the invention, the holes formed by the grooves 4b of the vibration-proof member 4 in cooperation with the outer surface of the motor 3 are used as the channels through which the lead wires 6 run. This produces an advantage of simplifying the layout and holding operations of the lead wires 6 on the assembly line.

For note, in the above-described embodiment, the stepping motor is used as the drive source for the diaphragm. The present invention is also applicable to a barrel having the stepping motor as the lens drive source.

Also, as the vibration-proof member, if an electrically insulating material is used, it can serve as a substitute for the insulating tubes of the lead wires.

The present invention, as has been described above makes it possible that when the diaphragm or the lens is driven to move by the motor built in the lens barrel, the vibrations giving bad influences not only to these members to be driven but also to the camera are surely prevented by the vibration-proof member on the outer periphery of the motor, thereby the performance of the camera cannot be damaged. Another advantage of the invention is that the lead wires for driving motion of that motor can be simply laid out by utilizing the space suitably.

What is claimed is:

1. A lens barrel comprising:
(a) an electromagnetic drive motor mounted on a stationary portion of said lens barrel; and
(b) a vibration-proof member for preventing vibrations of said motor,
said vibration-proof member wrapping the outer periphery of said motor and having holding portions for fixing the lead wires for power supply to said motor.

2. A lens barrel comprising:
(a) an electromagnetic drive motor;
(b) a vibration-proof member for preventing vibrations of said motor,
said vibration-proof member having a ring form made of an elastic material and the inner surface of said ring having grooves for holding the lead wires of said motor.

3. A lens barrel comprising:
(a) a stationary cylinder constituting part of said lens barrel;
(b) a diaphragm device;
(c) a stepping motor for driving said diaphragm device,
said stepping motor comprising a stator and a rotor which are formed to a hollow core cylindrical shape with an aperture opened so as to pass an image bearing beam at the central portion of said rotor; and
(d) a vibration-proof member for preventing vibrations of said motor,
said vibration-proof member being made of a vibration absorbable material, being formed to a cylindrical shape,
when said motor is fixedly mounted in the inner diameter of said stationary cylinder being positioned between said stator and said stationary cylinder so as to wrap the outer periphery of said stator, and further
said cylindrical vibration-proof member having grooves for accommodation of the lead wires of said motor.

* * * * *